United States Patent [19]

Lee

[11] Patent Number: 5,028,364

[45] Date of Patent: Jul. 2, 1991

[54] PROCESS FOR FORMING CONCRETE STRUCTURES AND STRIPPING CONCRETE FORMS

[76] Inventor: Yuan-Ho Lee, No. 851, Chung-San Rd., Nan-Pao Tsun, Kuei-Jen Hsian, Tainan Hsieng, Taiwan

[21] Appl. No.: 370,850

[22] Filed: Jun. 23, 1989

[30] Foreign Application Priority Data

Jan. 13, 1989 [TW] Taiwan ............................ 78100226

[51] Int. Cl.[5] ........................ B28B 7/36; B28B 13/06; B29C 41/42; E04G 11/06

[52] U.S. Cl. ........................................ 264/31; 249/33; 249/112; 249/114.1; 249/183; 264/313; 264/334

[58] Field of Search .................................... 264/31-35, 264/69, 71, 333, 334, 338, 313; 249/33, 47, 27, 112, 114.1, 183; 425/DIG. 58

[56] References Cited

U.S. PATENT DOCUMENTS

| | | | |
|---|---|---|---|
| 718,429 | 1/1903 | Conway | 249/39 |
| 778,583 | 12/1904 | Jarvis | 249/33 |
| 821,277 | 5/1906 | Bellars | 249/39 |
| 983,597 | 2/1911 | Andrew | 264/34 |
| 986,565 | 3/1911 | Hedrich | 249/33 |
| 1,863,549 | 6/1932 | Lockwood | 264/35 |
| 2,004,465 | 6/1935 | Dietrichs | 264/256 X |
| 3,192,594 | 7/1965 | Fougea | 249/33 X |
| 3,367,618 | 2/1968 | Masur | 249/39 |
| 3,558,095 | 1/1971 | McNiel | 249/27 X |
| 3,659,978 | 5/1972 | Svensson et al. | 249/33 X |
| 3,884,613 | 5/1975 | van der Lely | 249/27 X |
| 3,954,377 | 5/1976 | Schol et al. | 249/112 X |
| 3,976,741 | 8/1976 | Lowe et al. | 264/333 X |
| 4,052,031 | 10/1977 | Melfi | 249/34 X |
| 4,116,415 | 9/1978 | Ward | 264/333 X |
| 4,422,617 | 12/1983 | Gallis | 249/34 X |
| 4,557,881 | 12/1985 | Rabotski | 264/334 X |
| 4,678,157 | 7/1987 | Fondiller | 264/31 X |
| 4,799,982 | 1/1989 | Vicino | 264/256 X |

FOREIGN PATENT DOCUMENTS

| | | | |
|---|---|---|---|
| 491462 | 3/1953 | Canada | 249/39 |
| 1804002 | 9/1969 | Fed. Rep. of Germany | 249/39 |
| 2756996 | 6/1979 | Fed. Rep. of Germany | 249/39 |

*Primary Examiner*—Jan H. Silbaugh
*Assistant Examiner*—Karen Kutach
*Attorney, Agent, or Firm*—Ladas & Parry

[57] ABSTRACT

A process for forming a concrete wall having a projecting portion such as those formed at a door, windows or the like, including installing two spaced apart opposite form boards which confine a cavity for receiving concrete, one of which has a groove for forming the projecting portion, lining the wall segments with a cushion member which is made of a flexible and compressible material, pouring concrete into the cavity, and moving simultaneously the form board from the formed concrete in a direction similar to the direction of the projecting portion utilizing a hydraulic drive mechanism.

7 Claims, 8 Drawing Sheets

PROCESS FOR FORMING CONCRETE STRUCTURES AND STRIPPING CONCRETE FORMS

Background of the Invention

This invention relates to a process for mechanically stripping form boards from a concrete structure, and particularly to a process for mechanically stripping form boards from a vertical wall having projecting parts such as those formed for decorative purposes, and those formed at doors and windows, etc., for deflective purposes.

Molding devices exist in numerous forms in the art. Some of the molding devices include a collapsible frame which moves form boards used for forming culverts, tunnels or the like. Molding devices used for forming box-like concrete structures also include a collapsible core form which can be stripped from the inner surface of the formed enclosed wall of the box-like structure. There are also form board assemblies for forming concrete blocks, and concrete columns, etc, which can be simultaneously stripped from the outer surface of the formed structure.

It is a common practice that projecting parts of a wall such as flanges A formed at doors or windows to prevent water flowing down from roofs and upper parts of walls, decorative flanges D, C, and projecting supports for mounting an air-conditioner B all of which are shown in FIG. 1, to be formed separately from the formation of the wall from which they project, by setting up a form on the basic wall after the basic wall is formed. This process is time consuming. It is now possible to form vertical concrete walls having the above described projecting parts by using steel form panels having grooves or cavities. However, these projecting parts easily break at their edges if the form panels swing or do not move properly when the steel form panels are stripped mechanically from the formed concrete structure panels. Therefore, it is desirable to provide a particular process for stripping form panels from the vertical wall of the type described above.

SUMMARY OF THE INVENTION

It is an object of the invention to provide a process for molding a concrete wall having a projecting portion such as that formed at a door, a window or the like, in which the projecting portion are formed simultaneously with the formation of the wall, and form boards can be stripped simultaneously from the formed concrete by a mechanical means without causing the form boards to swing thereby minimizing the risk of causing damage to the projecting part.

According to the present invention, a process for forming a concrete wall having a projecting portion such as that formed at an opening for a door, a window or the like comprises installing two spaced apart form boards which confine a cavity for receiving concrete, at least one of the form boards having a groove for forming the projecting portion and wall segments which confine the groove, lining the wall segments with a cushion member which is made of a flexible and compressible material, pouring concrete into the cavity until the concrete fills the cavity, providing hydraulic drive means respectively at the top and bottom sides of the form boards, and moving simultaneously the form boards from the formed concrete in a direction similar to the direction of the projecting portion by means of the hydraulic drive means.

The present exemplary preferred embodiment will be described in detail with reference to accompanying drawings, in which:

DETAILED DESCRIPTION OF THE PREFERRED EMBODIMENT

Figure 2:
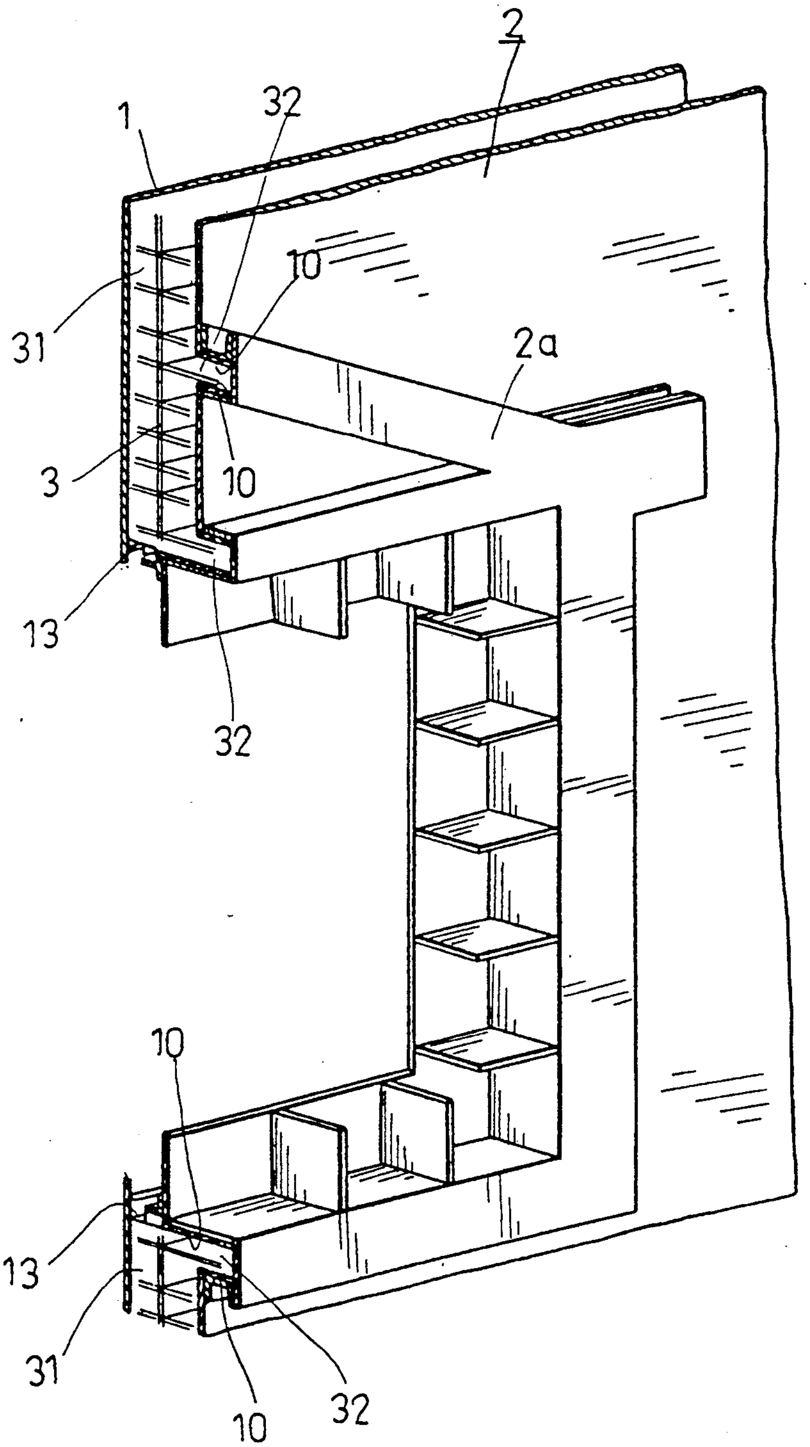
FIG. 2 is a schematic perspective view showing a portion of a form assembly to form the wall of FIG. 1.
Figure 3:
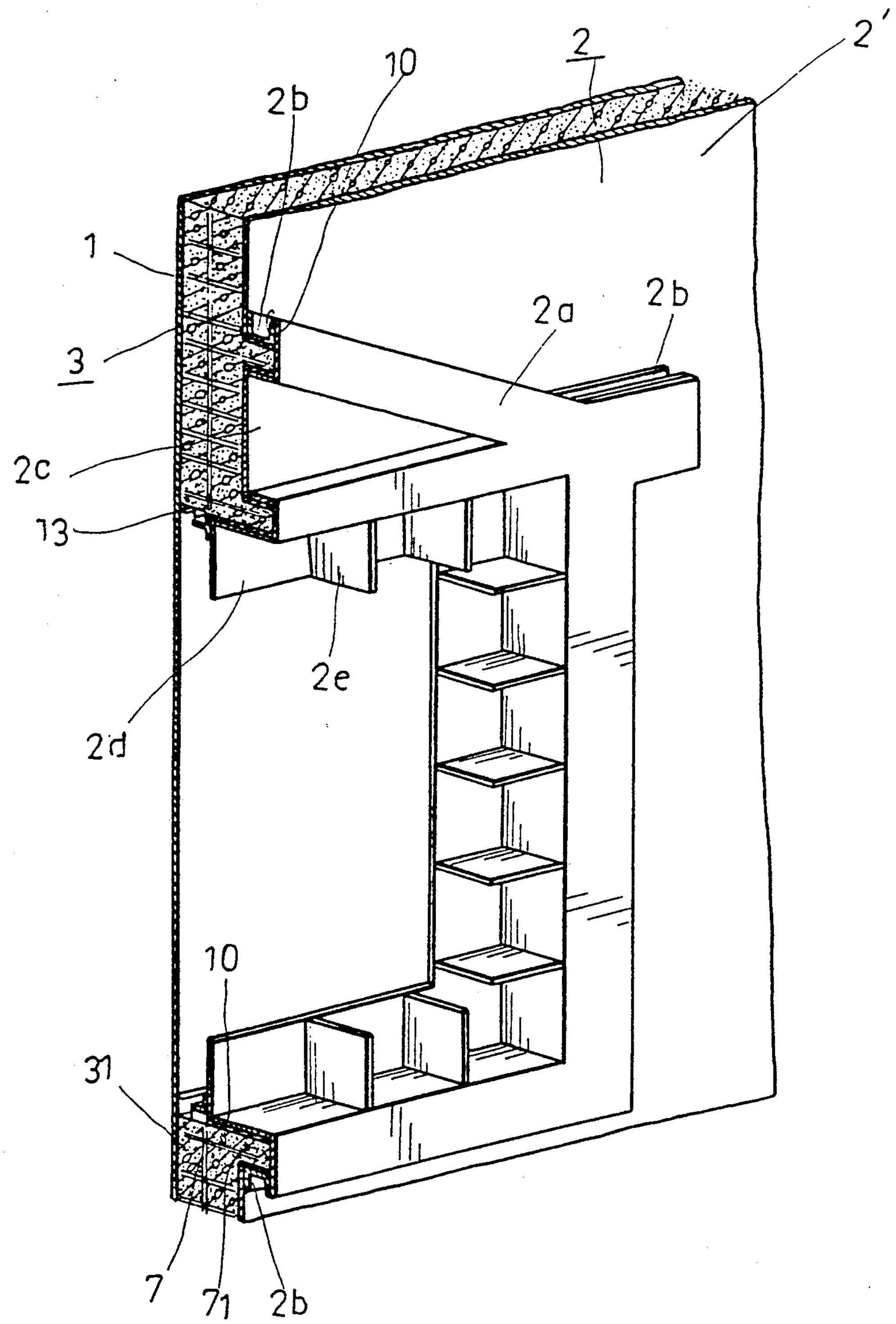
FIG. 3 is a perspective view of the portion of the form assembly of FIG. 2 which is filled with concrete.

Referring to FIG. 2, and FIG. 3 a portion of a form assembly is shown for forming a vertical wall of a room, in which a window is desired to be formed. Numeral 1 represents an inner or first form board for forming the inner side of the vertical wall and numeral 2 represents an outer or second form board for forming the outer side of the vertical wall. Form boards 1 and 2 are installed in a spaced apart relationship through tie rods and fastening members which are illustrated. The outer form board 2 and the inner form board confine a mold cavity 31 therebetween. Reinforcement rods and wires 3 are provided between the inner and outer form board in a conventional way.

The outer form board 2 includes a panel 2' of particular construction having a window forming mold which includes a one piece plate member **2*a* lying in a plane parallel to the panel 2'. Channel pieces 2*b* are used to connect the plate 2*a* to the panel 2'. A substantially triangular plate member 2*c* which is coplanar with the panel 2' is connected to the plate member 2*a* to fill a triangular opening formed between spaced apart portions of the plate member 2*a*. A rectangular aluminum window frame 13 is connected to the inner form board 1. A rectangular frame member 2*d* of L-shaped cross-section is connected to the window frame 13 and the plate member 2*a*. Transverse reinforcement pieces 2*e* are attached to the frame member 2*d*. The above mentioned window forming mold confines grooves 32 to permit concrete therein to form flanges or projecting parts (designated at 71 in FIG. 3) around the window opening of a concrete wall (designated at 7 also in FIG. 3). The inner side of the wall segments which confine the groove 32 is lined with cushioning sheets 10 which are flexible and compressible. Preferably, the cushioning members 10 are made of a foamed polymeric material such as ethyl vinyl acetate copolymer, polyurethane or a rubber. Concrete is poured into the cavity 31 and the grooves 32 as shown in FIG. 3**.

After the concrete has hardened, the outer form board 2 is first stripped from the formed concrete before the inner form board 1. In stripping form board 2 from the wall, to avoid causing damage to the flange or the projecting part formed on the wall, it is necessary to move the form board 2 in the same direction as that of the projecting part without causing the form board 2 to swing. With this aim in mind, the inventor of the present invention suggests a particular molding device which is disclosed in his copending application and is also described hereinunder.

Figure 4:
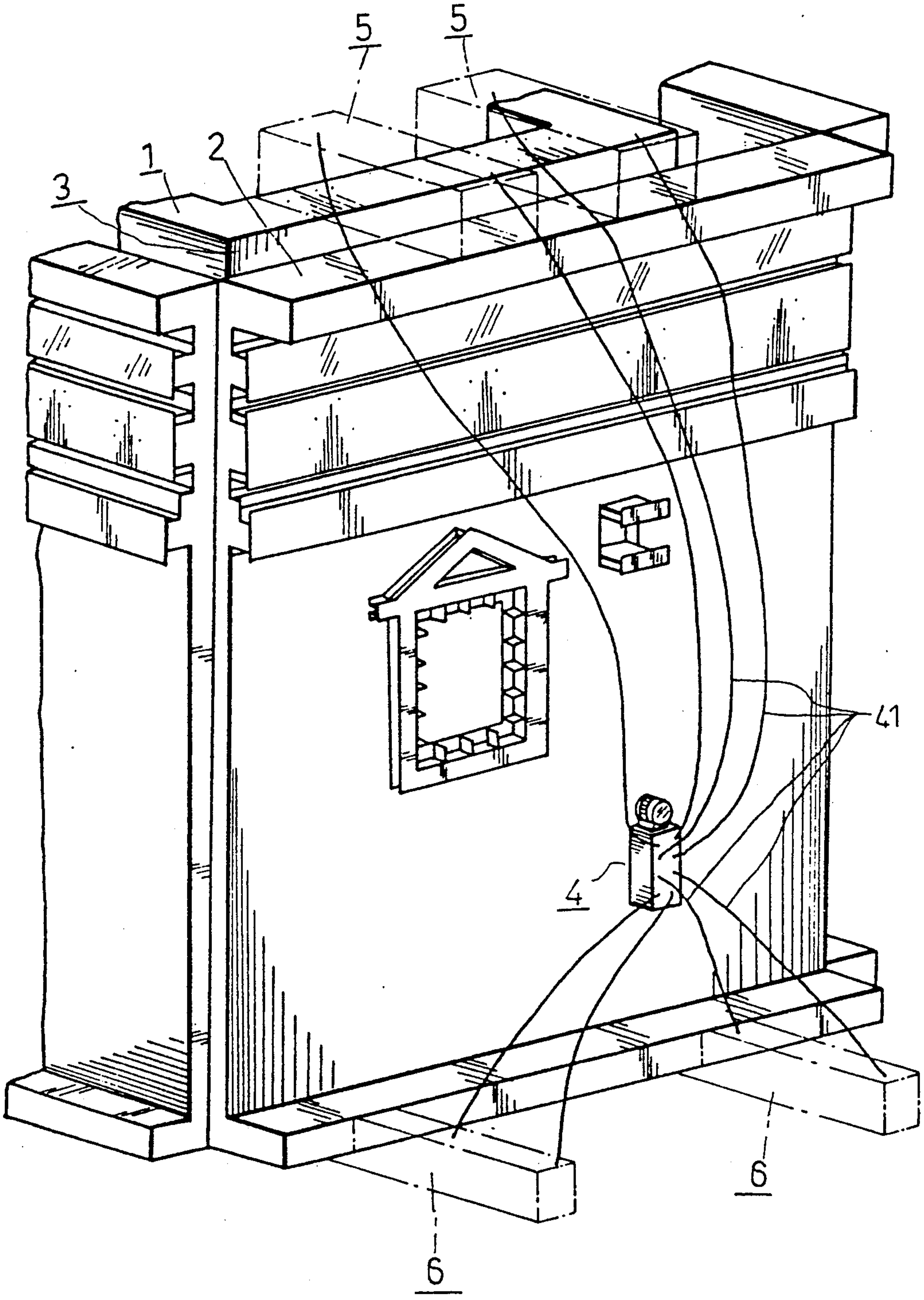
FIG. 4 is a schematic perspective view showing the molding device of FIG. 1 in more detail.

Referring to FIG. 4, upper hydraulic drive members 5 are provided on the top sides of the first and second form boards 1, 2. Lower hydraulic drive members 6 are respectively mounted on the bottom sides of the first and second form boards.

Figure 5:
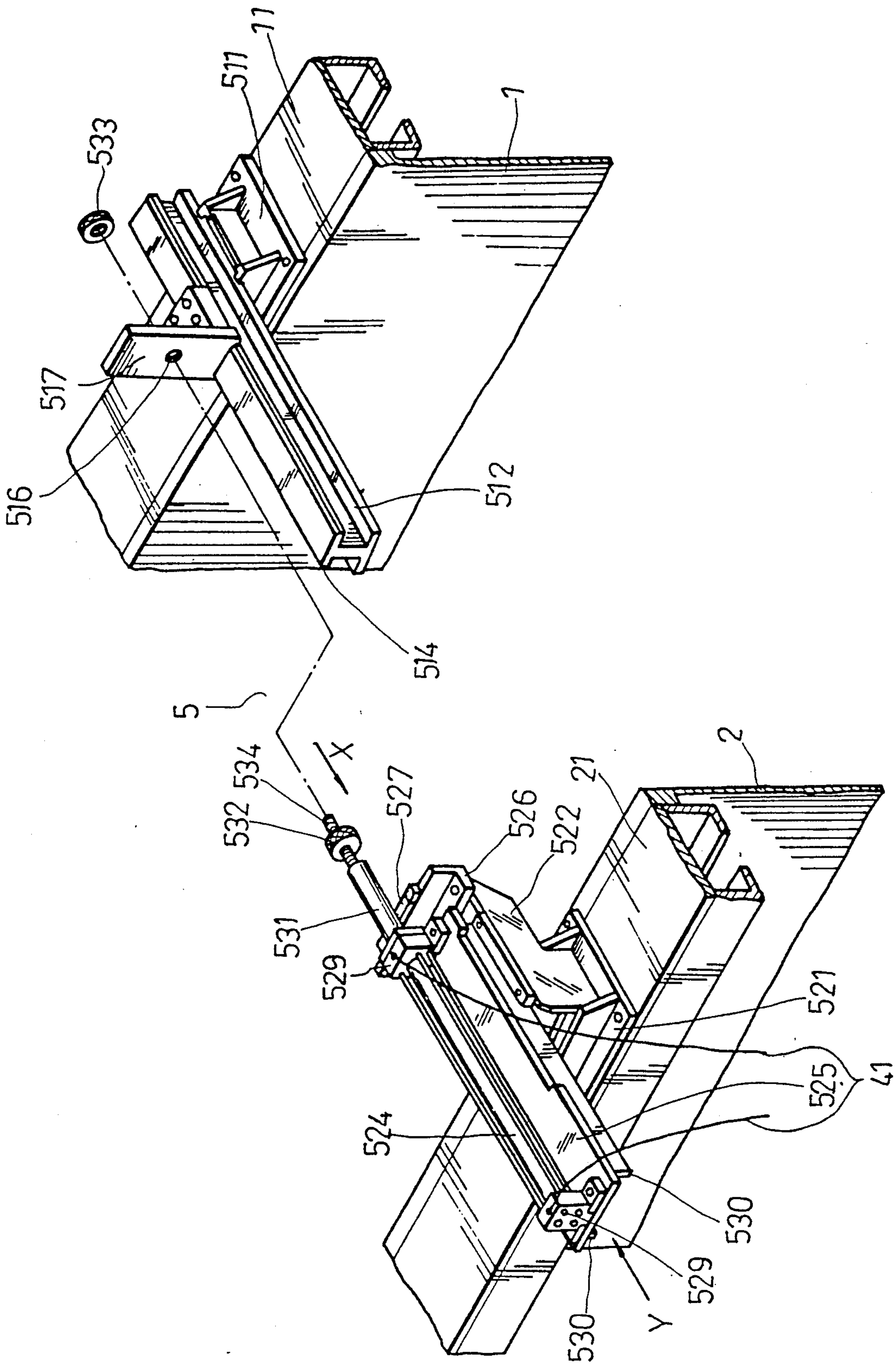
FIG. 5 shows an upper hydraulic drive unit of the molding device.
Figure 7:
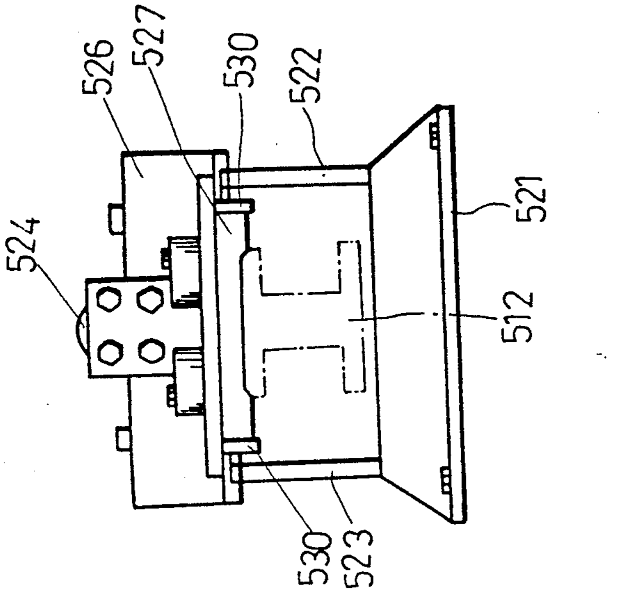
FIG. 7 is an elevation view as viewed from the direction designated by arrow Y.
Figure 6:
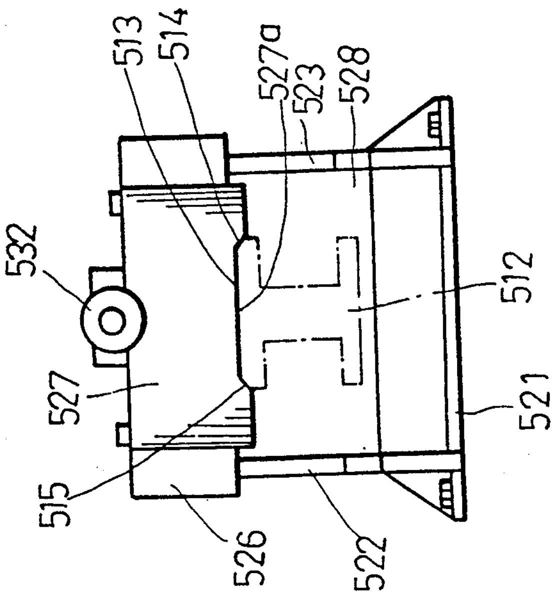
FIG. 6 is an elevation view as viewed from the direction designated by arrow X.

As shown in FIGS. 5, 6 and 7, each upper hydraulic drive member 5 includes a first mounting plate 511 which is secured to a reinforcement bar 11 at the top side of the form board 1, a slide bar 512 having an I-shaped cross-section and fixed to the mounting plate 511, a bearing plate 517 secured to the slide bar 512, a second mounting plate 521 secured to a reinforcement bar 21 provided on the top side of the form board 2, a support bar 525 mounted on the second mounting plate 521, and a hydraulic cylinder 524 mounted on the support bar 525.

The second mounting member 521 has two flanks 522, 523 which are secured thereto and extend upward to hold the support bar 525. An angled plate 526 is secured to the flanks 522, 523 and a front plate 527 is secured to the angled plate 526. Two guide members 530 are formed on the bottom side of the support bar 525. The flanks 522, 523 and the support bar 525 confine a space to permit the slide member 512 to extend thereinto. The slide bar 512 and the support bar 525 project in opposite directions from the first and second form boards 1, 2. The front plate 527 is provided with a slide groove **527*a* to receive an upper part 514 of the slide bar 512**.

At two ends of the hydraulic cylinder 524 are two hydraulic containers 529 which are mounted on the support bar 525 and which are provided with oil conduits 41. A piston rod 531 of the cylinder 524 has a threaded end 534 to pass through a hole 516 of the bearing plate 517 of the first form board 1. Nuts 532, 533 are provided on the threaded end 534.

Figure 9:
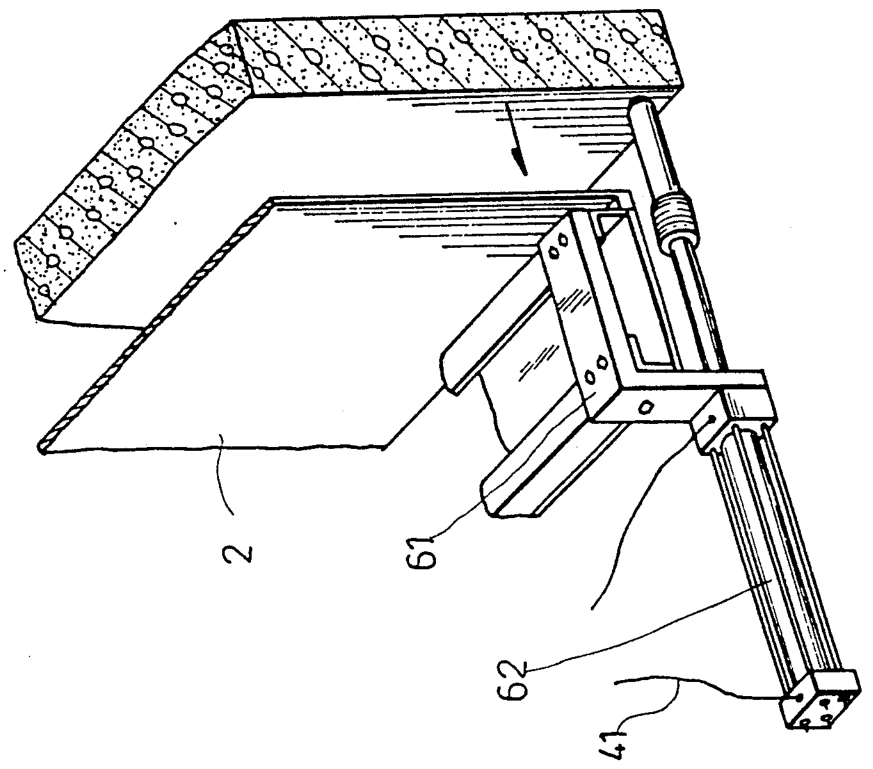
FIGS. 8 and 9 show hydraulic drive units provided at the bottom side of the form board.
Figure 8:
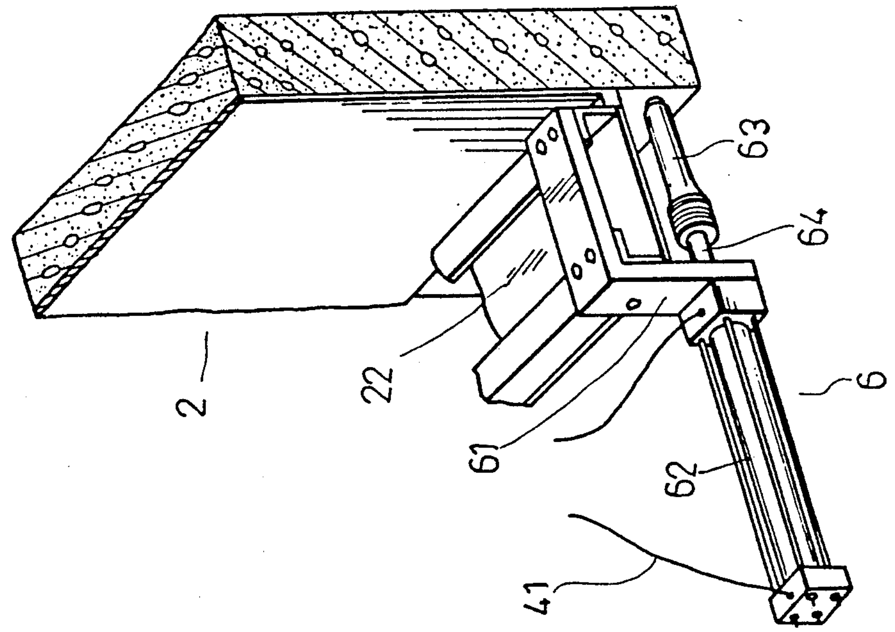

As shown in FIGS. 8 and 9, each lower hydraulic drive member 6 includes a mounting member 61 which is secured to a lower reinforcement channel bar 22 of the form board 2. A hydraulic cylinder 62 is secured to the mounting member 61 and incorporates a piston rod 64 with an adjustment member 63. The piston rod 64 can be adjusted to extend to a bearing wall above which a new wall will be formed by the form boards 1 and 2.

The slide bar 512 can extend into the space 528 of the second mounting member 521 by slightly lifting and moving the form board 2 toward the form board 1. Then, the slide bar 512 is caused to engage with the the slide groove **527*a* of the front plate 527. The threaded end 534 of the piston rod 531 is threaded through the hole 516 of the bearing plate 517 and fixed thereto by tightening the nuts 532 and 533, thereby fastening the top ends of the form boards 1 and 2**.

Figure 1:
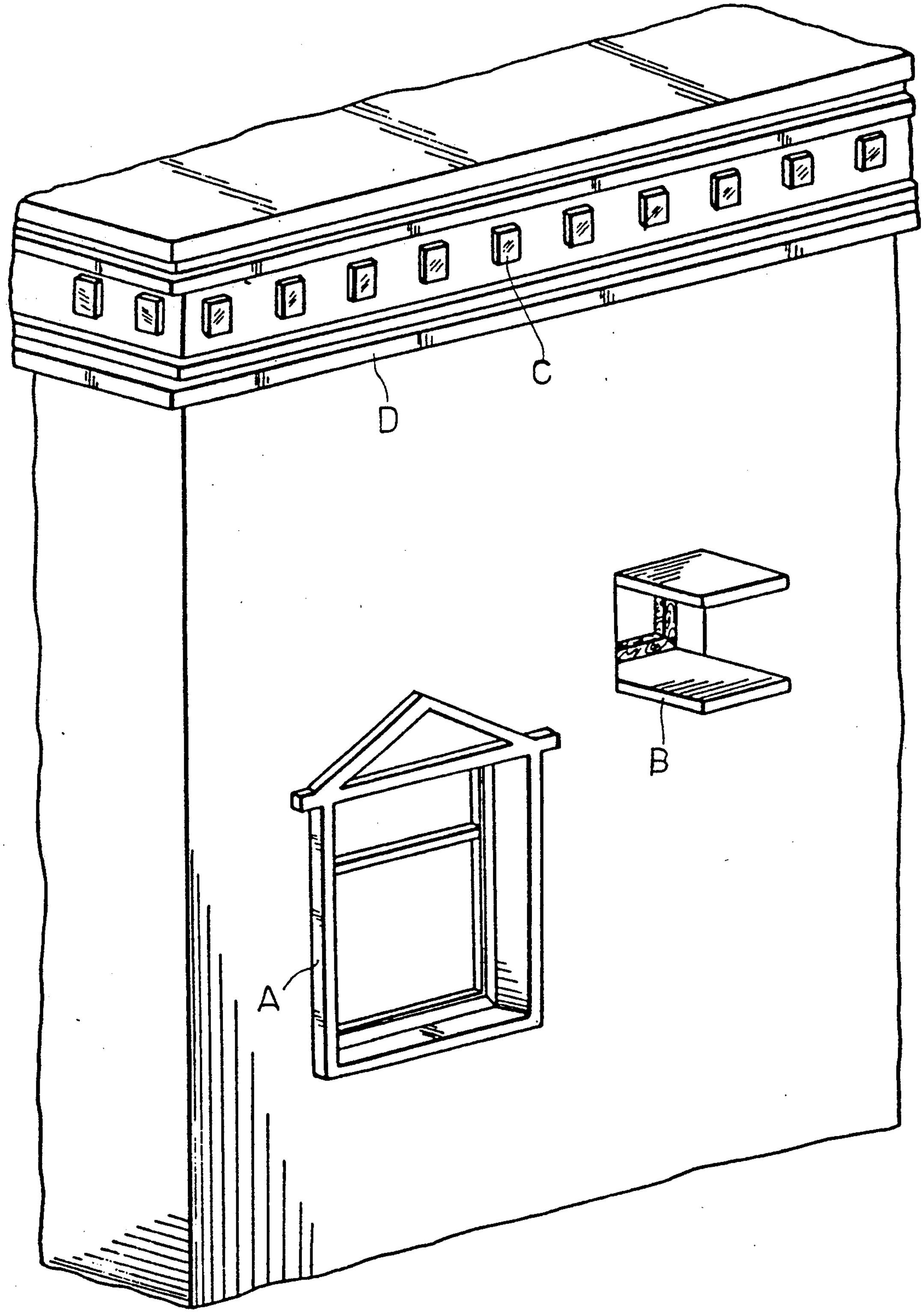
FIG. 1 shows a wall having projecting parts extending therefrom.

The operation of stripping form boards according to the present invention from an outer side of a vertical wall having projecting parts as shown in FIG. 1 is described hereinbelow. Hydraulic drive members 5 and 6 are operated simultaneously through a control unit 4. The piston rods 531 which bear against the bearing plates 517 extend forward and move the form board 2 away from the form board 1 which is immobilized. Simultaneously with the operation of the piston rods 531, the piston rods 64 of the hydraulic cylinders 62 provided at the bottom side of the form board 2 extend forward and moves the lower portion of the form board 2.

Since the slide bars 512 and support bars 525 are associated with the hydraulic drive members, and the upper and lower parts of the form board 2 are moved simultaneously, the movement of the form board 2 is guided so as to be in a direction normal to the surface of the formed without any swinging movement. As can best be seen in FIG. 3 during separation of the form board 2 from the wall 7, the projecting parts 71 are gradually released smoothly from the grooves 32 of the form board 2 without causing much friction with the wall segments which confine grooves 32 due to the presence of the cushion members 10. Preferably, a foamed cushion member is more effective for the protection of the projecting part than a rubber.

Figure 11:
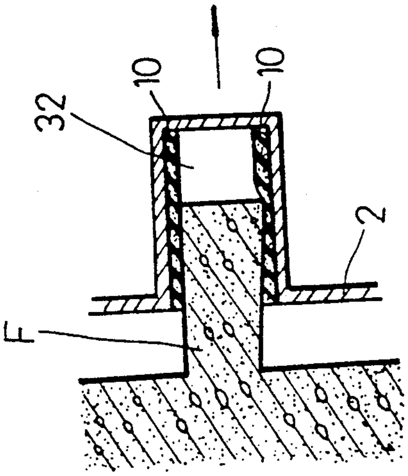
FIG. 11 shows how the projecting part of FIG. 10 is released from the groove of the form board.
Figure 10:
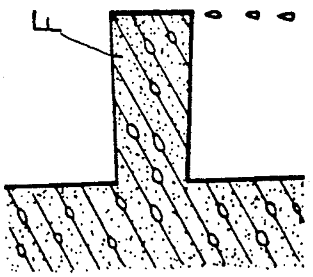
FIG. 10 shows a particular form of a projecting part of a wall.

The presence of the cushion member 10 is also advantageous for a projecting part like a flange F provided above a window, which is slightly slanted downward to permit water to be drained therefrom as shown in FIG. 10. When releasing such a projecting part from the groove 32, the edge of the projecting part still can be moved smoothly along the wall segment of the groove, as shown in FIG. 11, due to the presence of cushion members 10.

With the invention thus explained, it is apparent that various modifications and variations can be made without departing from the scope of the invention. It is therefore intended that the invention be limited only as indicated in the appended claims.

What I claim is:

1. A process for forming cementitious material into a cementitious structure having projecting portions, comprising:

installing two spaced apart opposite form boards, each having a top and bottom, said two form boards defining a space for receiving said cementitious material, at least one of said form boards having cavities for forming said projecting portions;

lining said cavities for forming said projecting portions with a flexible and compressible cushioning material;

pouring said cementitious material into said space until said cementitious material fills said space and said cavities to form said cementitious structure having projecting portions;

providing hydraulic drive means respectively at said top and bottom of said form boards; and moving simultaneously said top and bottom of said form board having said cavities from said formed cementitious structure in a direction approximately similar to the direction of said projecting portions by means of said hydraulic drive means, whereby as said form board having cavities is moved away from said projecting portions, said flexible and compressible cushioning material deforms to allow said projecting portions to be freed from said form board having cavities without damaging said projecting portions.

2. A process as claimed in claim 1, wherein said flexible and compressible cushion member is made from materials selected from the group consisting of ethylene vinyl acetate copolymer and polyurethane.

3. A process as claimed in claim 1, wherein said hydraulic drive means includes at least one upper hydraulic member mounted on a top end of one of said form boards, and at least one lower hydraulic member mounted on a bottom end of one of said form boards.

4. A process as claimed in claim 3, wherein said upper hydraulic member displaces said form board having said cavities relative to said cementitious structure formed and to said other form board, and said lower hydraulic-member displaces said board having said cavities relative to said cementitious material formed between said form boards, said upper and lower hydraulic members operating simultaneously.

5. A process for forming pourable cementitious materials into solid cementitious structures having projecting portions and separating form boards from the solidified cementitious structure comprising:

installing two spaced apart form boards each having a top and bottom, said two form boards defining a space for forming said cementitious materials into said cementitious structure, at least one of said form boards having cavities for forming said projecting portions;

lining said cavities for forming projecting portions with a flexible and compressible cushioning material;

filling said space between said form boards with said cementitious material and allowing said cementitious material to harden into said cementitious structure having projecting portions;

providing drive means at said top and bottom of said form boards; and moving simultaneously said top and bottom of said form boards having said cavities away from said hardened cementitious structure in a direction similar to the direction of said projecting portions by said drive means, whereby as said form board having cavities is moved away from said projecting portions, said flexible and compressible cushioning material deforms to allow said projecting portions to be freed from said form board having cavities without damaging said projecting portions.

6. A process as claimed in claim 5, wherein said flexible and compressible cushioning material is made from materials selected from the group consisting of ethylene vinyl acetate copolymer and polyurethane.

7. A process as claimed in claim 5, wherein said drive means comprises hydraulic drive members.

* * * * *